(12) United States Patent
Barnell

(10) Patent No.: US 11,406,094 B1
(45) Date of Patent: Aug. 9, 2022

(54) ICE FISHING POLE

(71) Applicant: Daniel R. Barnell, New Ulm, MN (US)

(72) Inventor: Daniel R. Barnell, New Ulm, MN (US)

(*) Notice: Subject to any disclaimer, the term of this patent is extended or adjusted under 35 U.S.C. 154(b) by 141 days.

(21) Appl. No.: 16/840,600

(22) Filed: Apr. 6, 2020

(51) Int. Cl.
*A01K 97/01* (2006.01)
*A01K 97/10* (2006.01)

(52) U.S. Cl.
CPC .............. *A01K 97/01* (2013.01); *A01K 97/10* (2013.01)

(58) Field of Classification Search
CPC ......... A01K 97/01; A01K 97/10; A01K 87/00
See application file for complete search history.

(56) References Cited

U.S. PATENT DOCUMENTS

| | | | |
|---|---|---|---|
| 2,624,972 A | 1/1953 | Burg | |
| 2,714,270 A | 8/1955 | Premo | |
| 3,034,247 A | 5/1962 | Lunsman | |
| 3,729,849 A | 5/1973 | Richard | |
| 3,927,486 A * | 12/1975 | Yuen | A01K 87/00 43/20 |
| 4,075,776 A | 2/1978 | Fiebig | |
| 4,620,387 A | 11/1986 | Bloom | |
| 4,662,099 A * | 5/1987 | Stewart | A01K 97/12 43/17 |
| 5,197,218 A | 3/1993 | Legard | |
| 5,613,318 A * | 3/1997 | Hislop | A01K 97/12 43/16 |
| 5,970,645 A | 10/1999 | Thill | |

(Continued)

OTHER PUBLICATIONS

Executed Declaration from Daniel R. Barnell dated Mar. 27, 2020, 2 pages.

*Primary Examiner* — Joshua J Michener
*Assistant Examiner* — Henry Hooper Mudd
(74) *Attorney, Agent, or Firm* — Peter J. Ims; Westman, Champlin & Koehler, P.A.

(57) ABSTRACT

A method of ice fishing includes providing an ice fishing pole having a handle having a first side and an opposing second side, a rod portion extending from the handle wherein the ice fishing pole has a longitudinal axis extending through the handle and the rod portion. The ice fishing pole includes a reel rotatably secured to the handle proximate the second side of the handle, the reel rotatable about a rotational axis and containing fishing line and a grip attached to the reel a distance from the rotational axis wherein the grip is configured to be gripped and manipulate the reel. The method includes placing at least one object on the ice having two spaced apart elevated surfaces and lowering a baited hook into the water through the ice by unwinding fishing line from the reel. The method includes placing the first side of the handle on one of the two spaced apart elevated surfaces and the rod portion on the other of the two spaced apart elevated surfaces, wherein as a fish takes line from the reel, the reel rolls and moves the grip in an arcuate path such that a moment force is placed on the handle which causes the ice fishing pole to roll about the longitudinal axis on the two spaced apart elevated surfaces such that the second side of the handle is contacting one of the two spaced apart elevated surfaces wherein the rotation of the handle from the first side to the second side causes a sound that alerts an angler that the fish is moving the bait.

20 Claims, 3 Drawing Sheets

(56) References Cited

U.S. PATENT DOCUMENTS

| | | | |
|---|---|---|---|
| 6,421,948 B1 * | 7/2002 | Craig | A01K 97/12 43/17 |
| 7,213,361 B1 | 5/2007 | Perigo, Sr. | |
| 7,992,341 B1 | 8/2011 | Renstrom | |

* cited by examiner

ICE FISHING POLE

BACKGROUND

The discussion below is merely provided for general background information and is not intended to be used as an aid in determining the scope of the claimed subject matter.

The present disclosure relates to an ice fishing pole and a method of using the ice fishing pole. More particularly, the present disclosure relates to an ice fishing pole that rolls on an elevated surface above the ice where the movement of the ice fishing pole causes a noise which alerts the angler that a fish is on the line.

Many people enjoy ice fishing where one or more holes are drilled into a layer of ice covering a body of water. Common methods of ice fishing include using live bait, where the bait attracts the fish and using lures, with or without live bait.

A difference between using live bait and lures is the amount of attention that the angler has to pay to the lines. When using live bait, the natural movement and/or scent of the bait attracts the fish, which requires relatively little attention from the angler. In contrast, fishing with a lure, such as a jig, requires the angler to impart the movement into the lure, which requires relatively more attention than when fishing with live bait.

In many states, the angler is allowed to use two or more lines at once when ice fishing. It is common to fish with live bait with one line and a lure with the other line. As the line with the lure requires more attention, many anglers pay little attention to the line with the live bait. As little attention is paid to the line with the live bait, this type of fishing commonly referred to as "dead sticking." An issuing with dead sticking is that in many instances the fish can take the live bait without the angler being aware due to the lack of attention. The lack of attention can result in the fish taking the bait from the hook or the fish swallowing the bait and with the hook which can cause significant injury.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A method of ice fishing includes providing an ice fishing pole having a handle having a first side and an opposing second side, a rod portion extending from the handle wherein the ice fishing pole has a longitudinal axis extending through the handle and the rod portion. The ice fishing pole includes a reel rotatably secured to the handle proximate the second side of the handle, the reel rotatable about a rotational axis and containing fishing line and a grip attached to the reel a distance from the rotational axis wherein the grip is configured to be gripped and manipulate the reel. The method includes placing at least one object on the ice having two spaced apart elevated surfaces and lowering a baited hook into the water through the ice by unwinding fishing line from the reel. The method includes placing the first side of the handle on one of the two spaced apart elevated surfaces and the rod portion on the other of the two spaced apart elevated surfaces, wherein as a fish takes line from the reel, the reel rolls or flips and moves the grip in an arcuate path such that a moment force is placed on the handle which causes the ice fishing pole to roll or flip about the longitudinal axis on the two spaced apart elevated surfaces such that the second side of the handle is contacting one of the two spaced apart elevated surfaces wherein the rotation of the handle from the first side to the second side causes a sound that alerts an angler that the fish is moving the bait.

Another aspect of the present disclosure relates to a method of ice fishing. The method includes providing an ice fishing pole having a handle having a first side and an opposing second side and a rod portion extending from the handle. The ice fishing pole has a longitudinal axis extending through the handle and the rod portion. The ice fishing pole includes a reel rotatably secured to the handle proximate the second side of the handle, where the reel rotatable about a rotational axis and containing fishing line and a grip attached to the reel a distance from the rotational axis wherein the grip is configured to be gripped and manipulate the reel. The method includes lowering a baited hook into the water through the ice by unwinding fishing line from the reel. The method includes placing a bucket on the ice wherein a rim is elevated above the ice and then placing the first side of the handle on a first portion of the rim of the bucket and the rod portion on a second portion of the rim of the bucket such that the reel is above the rim of the bucket. As a fish takes line from the reel, the reel spins and moves the grip in an arcuate path such that a moment force is placed on the handle which causes the ice fishing pole to roll or flip about the longitudinal axis on the rim of the bucket such that the second side of the handle is contacting the rim of the bucket wherein the rotation of the handle from the first side to the second side causes the reel to be suspended within an interior space of the bucket and the movement of the handle to cause a sound that alerts an angler that the fish is moving the bait.

Another aspect of the present disclosure relates to a method of ice fishing. The method includes providing an ice fishing pole having a handle having a first side and an opposing second side and a rod portion extending from the handle. The ice fishing pole has a longitudinal axis extending through the handle and the rod portion. The ice fishing pole includes a reel rotatably secured to the handle proximate the second side of the handle, where the reel rotatable about a rotational axis and containing fishing line and a grip attached to the reel a distance from the rotational axis wherein the grip is configured to be gripped and manipulate the reel. The method includes lowering a baited hook into the water through the ice by unwinding fishing line from the reel. The method includes placing a bucket on the ice wherein a rim is elevated above the ice and then placing the first side of the handle on a first portion of the rim of the bucket and the rod portion on a second portion of the rim of the bucket such that the reel is above the rim of the bucket. As a fish takes line from the reel, the reel spins and moves the grip in an arcuate path such that a moment force is placed on the handle which causes the ice fishing pole to roll or flip about the longitudinal axis on the rim of the bucket such that the second side of the handle is contacting the rim of the bucket wherein the rotation of the handle from the first side to the second side causes the reel to be suspended within an interior space of the bucket and the movement of the handle to cause a sound that alerts an angler that the fish is moving the bait. The method includes gripping the handle, raising the ice fishing pole from the bucket and setting the hook into the fish. The method includes applying pressure to the reel with the user's thumb to provide drag to the reel, and reeling in the fish by rotating the reel to wind line thereon.

DETAILED DESCRIPTION OF ILLUSTRATIVE EMBODIMENTS

Figure 1:
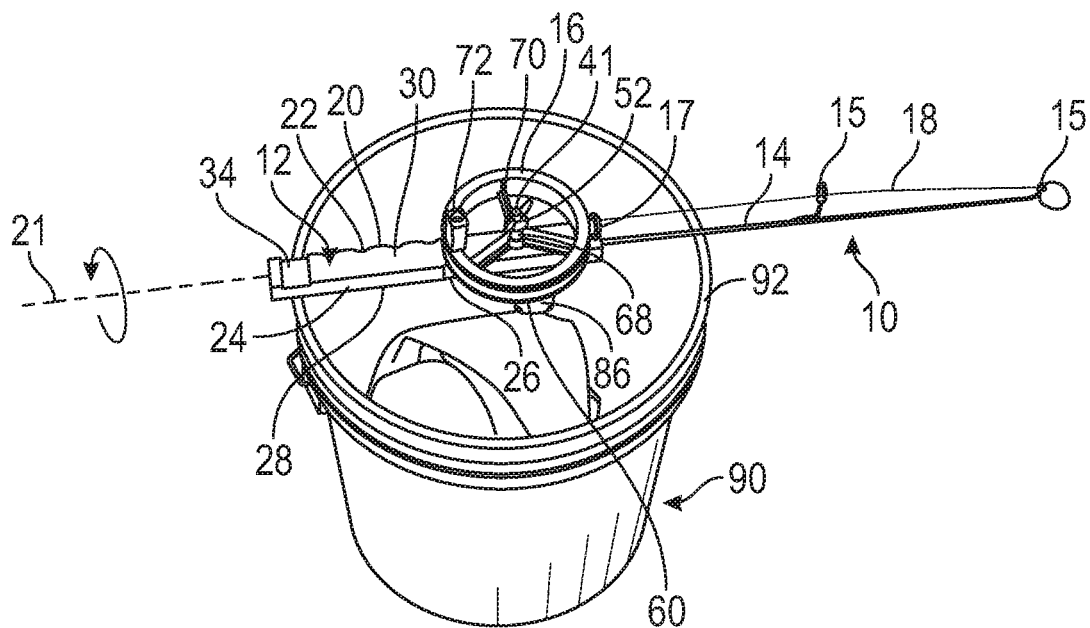
FIG. 1 is a perspective view of an ice fishing pole supported on a bucket in a first position.
Figure 2:
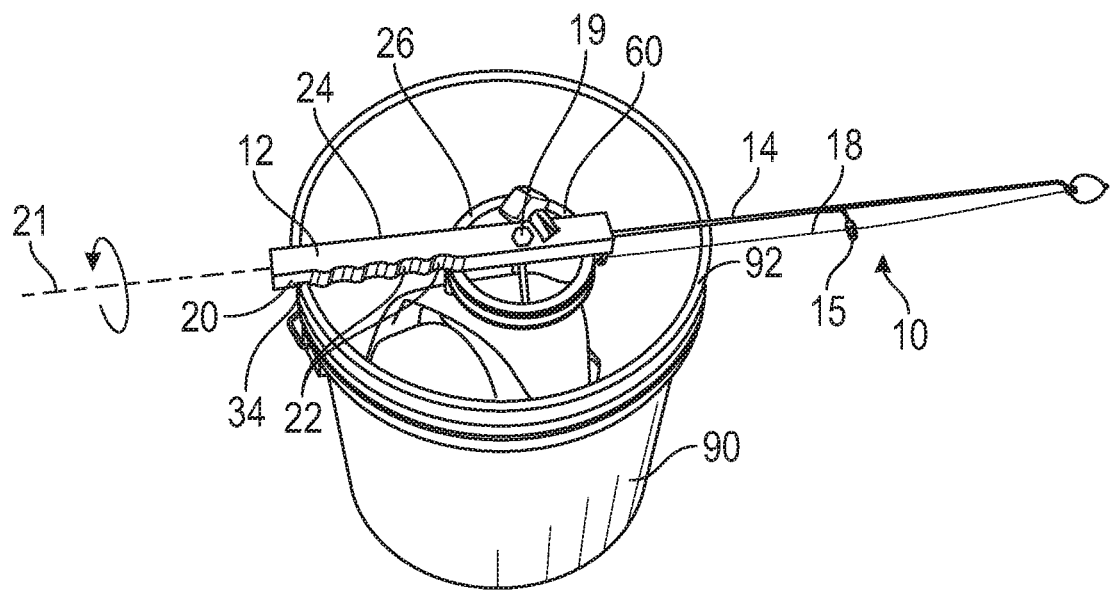
FIG. 2 is a perspective view of the ice fishing pole supported on the bucket in a second position.

An ice fishing pole is generally illustrated in FIGS. 1 and 2 at 10. The ice fishing pole 10 can be used while fishing with live bait, such as when dead stick ice fishing. The ice fishing pole 10 includes a handle 12 and a pole 14 extending from the handle 12. The handle 12 and the pole 14 are configured to rest on a rim 92 of a five-gallon bucket 90. As the fish take the bait and pulls line 18 from a reel 16 attached to the handle 12, the reel 16 rolls or flips and changes a center of gravity of the reel 16 which places a moment force on the handle 12. Once the moment force of the reel 16 on the handle 12 is a selected distance from a longitudinal axis 11 of the pole 10, the handle 12 and the rod portion 14 roll or flip about the longitudinal axis 11 on the rim 92 of the five-gallon bucket 90 which provides an audible signal that the fish has taken the bait from a first position illustrated in FIG. 1 to a second position illustrated in FIG. 2. Once the signal is realized by the angler, the angler can then set the hook and reel in the fish.

The reel 16 contains fishing line 18 that is threaded through a guide 17 on the handle 12 proximate the reel 16 and a plurality of eyes 15 secured to the rod portion 14. The guide 17 aids in properly winding and unwinding the line from the reel 16. As illustrated the guide 17 is secured to the handle 12. However, the guide 17 can also be secured to the rod portion 14.

A five gallon bucket 90 is typically used as the elevated surface to support the ice fishing pole 10 because the five gallon bucket 90 is inexpensive, can hold most if not all of the ice fishing equipment when transported to a selected location and can be used to transport the fish that are caught off of the ice. However, any item or items can be used that provide two elevated spaced apart surfaces that allow the ice fishing pole 10 to rotate about the longitudinal axis 11.

The handle 12 includes a bottom surface 20 that is configured to engage digits of the angler's fingers such that the handle 12 can be gripped to prevent slippage and a top surface 24 that is configured to be engaged by the angler's thumb. In one embodiment, the bottom surface 20 includes a plurality of indentions 22 that are configured to accept the four fingers of the angler's hand and the top surface 24 include an indention 26 proximate an outer surface of a right sidewall 60 of the reel 16 such that the angler can apply pressure to the outer surface of the reel 16 to act as a manual drag, as required. However, bottom surfaces 20 and top surface 24 of the handle 12 with different configurations are also within the scope of the present disclosure.

The handle 12 includes a right side surface 28 that is substantially planar such that the right side surface 28 is configured to rest on the rim 92 of the bucket 90. However, the right side surface 28 can be of any configuration that allows the surface to rest on the rim 92 of the bucket 90 until the fish pulls line from the reel 16.

Figure 3:
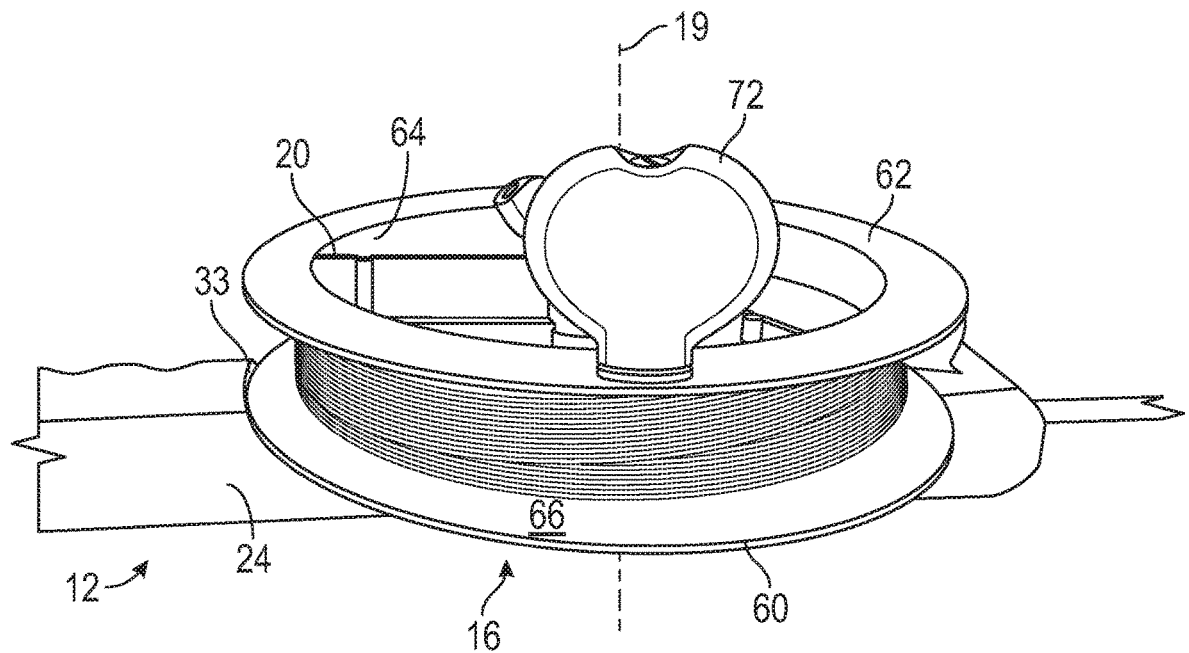
FIG. 3 is a view of a reel of the ice fishing pole rotatably secured to the handle.

Referring to FIGS. 1-3, the handle 12 includes a left side surface 30 that includes a cut out 33 configured to accept the right side wall 60 of the reel 16 to provide stability to the reel 16, as the reel 16 is rotated about a rotational axis 19. While the cut out 33 is preferred, the cut out 33 is optional.

The left side surface 30 has an optional groove 34 extending from the bottom surface 20 and the top surface 24 where the groove 34 is a depth and a width that is configured to accept the rim 92 of the bucket 90 when the fishing pole 10 rolls or flips about the longitudinal axis 11 as the fish takes line from the reel 16. The engagement of the groove 34 with the rim 92 of the bucket 90 prevents the ice fishing pole 10 from being dragged into the water through the hole in the ice.

Figure 4:
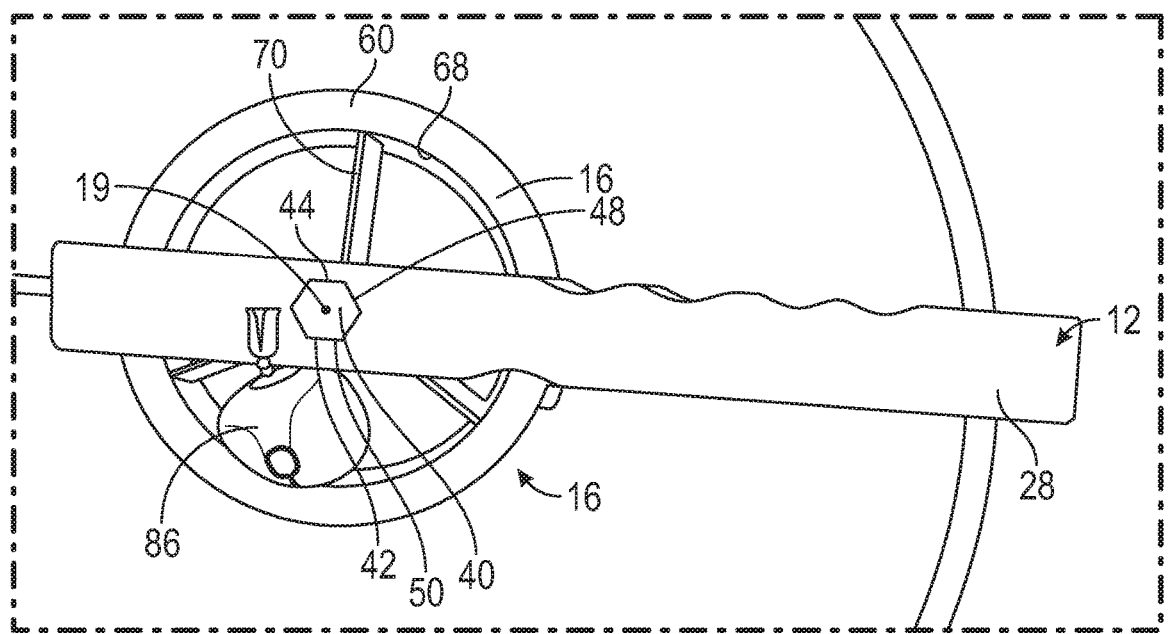
FIG. 4 is another view of the ice fishing pole supported on the bucket in the second position.

Referring to FIGS. 1, 2 and 4, the reel 16 is secured to the handle 12 with a bolt 40 positioned through a bore 46 extending from the right side surface 28 to the left side surface 30. The bolt 40 has a head 42 with flat surfaces 44 that is positioned within a recess 48 within the right side surface 28, where the recess 48 is in communication with the bore 46. The recess 48 has a complementary configuration to that of the head 42 such that the engagement of the flat surfaces 44 of the head 42 with flat surfaces 50 of the recess 48 prevent rotation of the bolt 40 relative to the handle 12. The recess 46 is of a depth such that an outer surface of the head 42 is even with the right side surface 28 or slightly recessed within the handle 12. While the bolt 40 is non-rotatably retained to the handle 12 through the use of one or more cooperating flat surfaces on the head 42 and the recess 46, the bolt 40 can be non-rotatably secured to the handle 12 by other mechanisms including, but not limited to an interference fit, a threaded screw portion, adhesive, glue, epoxy or any non-circular cross-sectional engagement between the bolt 40 and the handle 12. Additionally, it is within the scope of the present disclosure that the handle 12 and the shaft to which the reel 16 is rotatably retained is molded of a single piece.

The reel 16 is positioned over the portion of the bolt 40 extending beyond the left side surface 30 and a wing nut 52 threadably engages a threaded portion 41 of the bolt 40 to retain the reel 16 to the bolt 40. The bolt 40 acts as a fixed axle where the axis of rotation 19 extends through the bolt 40 from the head 42 to an end of the threaded portion 41. While a wing nut 52 is illustrated, other securing mechanism are also within the scope of the present invention, including but not limited to a standard nut, a retaining ring secured within a groove in the shaft, a roller pin extending through the shaft, a snap fit lock, and a quarter turn fastener.

Referring to FIGS. 1-4, the reel 16 includes the right side wall 60 and an opposing left side wall 62 connected with a circular bottom wall 64 where the right side wall 60, the left side wall 62 and the bottom wall 64 define a channel 66 configured to wind and unwind fishing line. The reel 16 includes a hub 68 that is positioned about the bolt 40 and a plurality of spokes 70 connecting the hub 68 with the circular bottom side wall 64.

The reel 16 includes a grip 72 that is rotatably secured to the left side wall 62 with a pin 74. The grip 72 is configured to be engaged with the angler's fingers to reel in line by rotating the reel 16 about the rotational axis 19. Additionally, the grip 72 is of a sufficient weight to change a center of gravity of the pole 10 and to create a moment force on the pole 10 to cause the pole 10 to rotate or spin about the longitudinal axis 11 on the rim 92 of the bucket 90 as the fish takes line.

Figure 5:
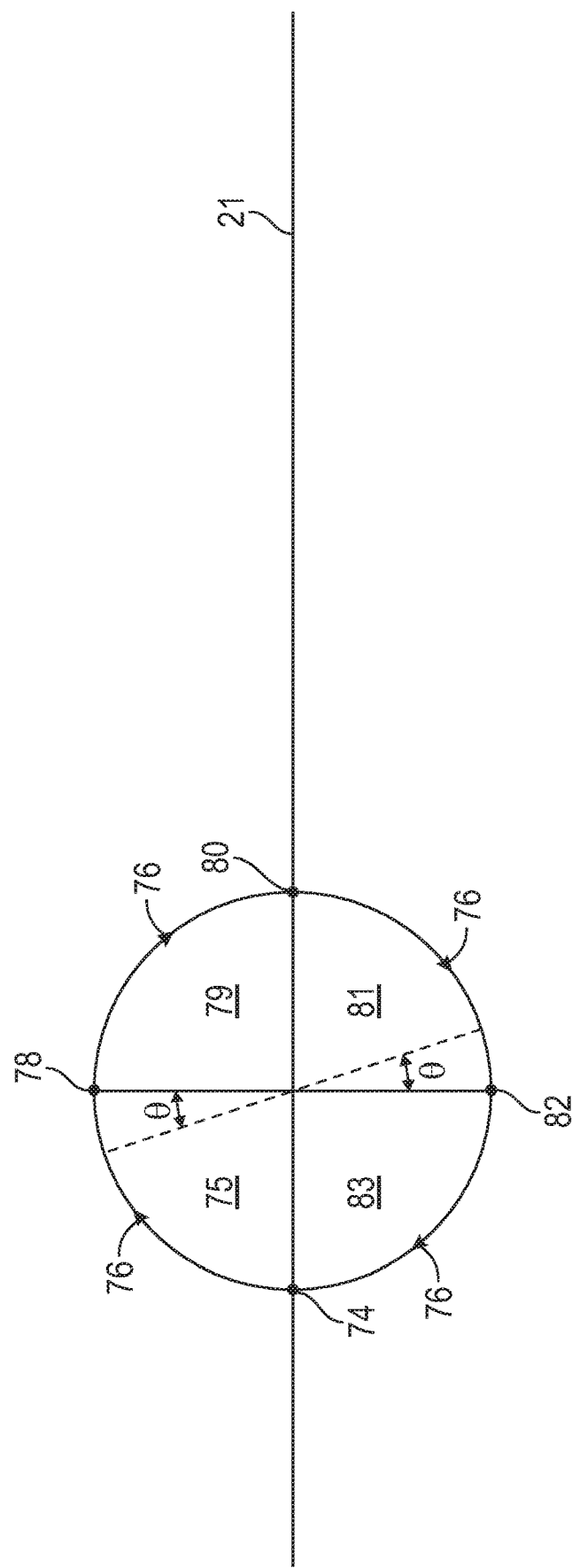
FIG. 5 is an illustration of moment forces on the ice fishing pole during a rotation of the reel.

Referring to FIG. 5, the moment force is illustrated as the grip 72 makes a single rotation. Starting at point 74 that is aligned with a longitudinal axis 11 of the ice fishing pole 10 there is none or substantially no moment force on the pole 10. As the grip 72 moves in a direction of arrow 76, the moment force increases as a distance of the grip 72 from the longitudinal axis 11 increases. The moment force is at a maximum at point 78 which is substantially orthogonal to the longitudinal axis 11. The moment force decreases as the grip 72 moves from point 78 to point 80, where the point 80 is substantially aligned with the longitudinal axis 11 and there is no moment force on the pole 10. The moment force then increases along the path of travel to point 82, which is substantially orthogonal to the longitudinal axis 11. The moment of force then decreases as the grip travels from point 82 to point 74.

As such, the path of travel of the grip 72 can be considered in four quadrants. In a first quadrant 75 between point 74 and 78 and a third quadrant 81 between points 80 and 82, the moment force increases and in the second quadrant 79 between points 78 and 80 and the fourth quadrant 83 between points 82 and 74 where the moment force decreases. The present disclosure utilizes the changing moment force and gravity to cause fishing pole 10 to rotate from the first position illustrated in FIG. 1 where the right side surface 28 is resting on the rim 92 of the bucket 90 to the second position illustrated in FIG. 2 where the left side surface 30 is resting on the rim 92 of the bucket 90.

In the process of rolling or flipping from the first position from where the right side surface 28 is resting on the rim 92 of the bucket 90 to the second position where the left side surface is resting on the bucket, the fishing pole 10 makes a sound which is an audible signal that a fish has taken the bait and is pulling out line. In some embodiments, a bell 86 is attached to the handle 12 to cause another audible signal to be produced to further signal to the angler that the fish has taken the bait and is pulling out line.

A weight of the grip 72 and the radius of the reel 16 dictate when the rod 10 will rotate about the longitudinal axis 11. As discussed above, the rod 10 is configured to rotate about the longitudinal axis 11 when the grip 72 passes the point 78 or 82. However, it is within the scope of the present disclosure that the rod 10 is configured to rotate about the longitudinal axis 11 when the grip 72 is at an angle θ relative to the point 78 or 82, where the angle θ ranges from about 25° or less from vertical.

While the ice fishing pole 10 is illustrated and described with the reel 16 proximate the left side surface 30 for an angler that reels with the left hand. The reel 16 can also be located proximate the right side surface 24 for anglers that reel with the right hand where the action of the pole would be reversed where the pole 10 initially rests on the left side surface 30 and when the fish takes the bait, the pole 10 rolls or flips about the longitudinal axis 11 to rotate where the right side surface 24 of the handle 12 rests on the rim 92 of the bucket 90.

To use the ice fishing pole 10, the angler drills a hole in the ice and lowers the bait to a selected depth by letting out line. The angler then positions the pail proximate the hole such that a tip 11 of the pole 10 is located above or near the hole in the ice.

The angler then places the right side surface 28 of the handle 12 and the pole 16 on opposing surfaces of the rim 92 of the bucket 90 such that the reel 16 is positioned above the pail. The angler then places the grip 72 is located within the first quadrant 75 or the third quadrant 81 where the moment force increases as the grip 72 moves away from the handle 12.

It is noted that the grip 72 can be positioned within either the first or third quadrant 75 or 81 to increase or decrease the sensitivity. To increase the sensitivity, the grip 72 is positioned closer to either the point 78 or 82 so that less movement is required to cause the rod 10 to flip from resting on the right side surface 28 to the left side surface 30. To decrease the sensitivity, the grip 72 is positioned closer to or proximate the point 74 or 80 or behind the point 74 or 80 so that more movement is required to the point 78 or 82 and which causes the rod 10 to flip, rotate or spin from resting on the rim 92 of the bucket 90 from the right side surface 28 to the left side surface.

Once the sensitivity is set, the angler can then cease paying attention to the ice fishing pole 10 with the bait in the water or start dead sticking. Once the fish takes the bait and pulls line from the reel 16, the reel 16 spins about the axis of rotation 17 until the grip 72 is proximate the point 78 or 82. With the grip 72 proximate the point 78 or 82, the moment force on the ice fishing pole 10 causes the pole 10 to rotate about the longitudinal axis 11. As the reel 16 moves over center, the moment force and gravity causes the handle 12 to move on the rim 92 of the bucket 90 such the left side surface 30 to rest on the rim 92 of the bucket 90 where the groove 34 is positioned about the rim 92 and prevents the fish from pulling the rod 10 into the hole in the ice. The movement of the handle 12 on the rim 92 of the bucket 90 causes a sound which signals the angler that a fish is moving the bait.

As the handle 12 rolls or flips, the optional bell 86 will also ring which provides a second alert that the fish is taking the bait. When the angler realizes that the fish is taking the bait, the angler can then grasp the handle 12 and can use the thumb to provide drag on the reel 16. Additionally, the angler grasps the grip 72 and reels in the line and the fish through the hole in the ice.

Although the present invention has been described with reference to preferred embodiments, workers skilled in the art will recognize that changes may be made in form and detail without departing from the spirit and scope of the invention.

What is claimed is:

1. A method of ice fishing comprising:
   providing an ice fishing pole comprising:
   a handle having a first side and an opposing second side,
   a rod portion extending from the handle wherein the ice fishing pole has a longitudinal axis extending through the handle and the rod portion;
   an axle extending from the second side of the handle linearly therethrough, the axle having a rotational axis substantially orthogonal to the longitudinal axis;
   a reel positioned about the axle, reel rotatably secured to the handle proximate the second side of the handle, the reel rotatable about the rotational axis of the axle and containing fishing line; and
   a grip attached to the reel a distance from the rotational axis wherein the grip is configured to be gripped and manipulate the reel;
   placing at least one object on the ice having two spaced apart elevated surfaces;
   lowering a baited hook into the water through the ice by unwinding fishing line from the reel;

placing the first side of the handle on one of the two spaced apart elevated surfaces and the rod portion on the other of the two spaced apart elevated surfaces; and wherein as a fish takes line from the reel, the reel rotates about the rotational axis and moves the grip in an arcuate path such that a moment force is placed on the handle which causes the ice fishing pole to roll about the longitudinal axis on the two spaced apart elevated surfaces such that the second side of the handle is contacting one of the two spaced apart elevated surfaces wherein the rotation of the handle from the first side to the second side causes a sound that alerts an angler that the fish is moving the bait.

2. The method of claim 1, wherein the at least one object comprises a bucket wherein the two spaced apart elevated surfaces comprise spaced apart portions of a rim of the bucket.

3. The method of claim 1, wherein the at least one object comprises a five gallon bucket wherein the two spaced apart elevated surfaces comprise spaced apart portions of a rim of the bucket.

4. The method of claim 1, wherein the pole rolls about the longitudinal axis when the grip is about orthogonal to the longitudinal axis.

5. The method of claim 1, wherein the pole rolls about the longitudinal axis when the grip is about 25° or less from orthogonal to the longitudinal axis.

6. The method of claim 1 and further comprising attaching a bell to the ice fishing pole wherein the bell rings when the ice fishing pole rolls about the longitudinal axis.

7. The method of claim 1, wherein the second side includes a groove substantially orthogonal to the longitudinal axis wherein after the handle rolls such that the second side is supported by the at least one object, the groove is positioned about one of the spaced apart elevated surfaces and prevents movement of the ice fishing pole along the longitudinal axis.

8. The method of claim 1, wherein the rotational axis of the reel is substantially orthogonal to the longitudinal axis of the ice fishing pole.

9. The method of claim 1, wherein the axle is non-rotatably secured to the handle.

10. The method of claim 1, wherein a drag is placed on the reel by applying pressure thereto with a thumb of the user.

11. A method of ice fishing comprising:
providing an ice fishing pole comprising:
a handle having a first side and an opposing second side,
a rod portion extending from the handle wherein the ice fishing pole has a longitudinal axis extending through the handle and the rod portion;
a reel rotatably secured to the handle proximate the second side of the handle, the reel rotatable about a rotational axis substantially orthogonal to the longitudinal axis and containing fishing line; and
a grip attached to the reel a distance from the rotational axis wherein the grip is configured to be gripped and manipulate the reel;
placing a bucket on the ice wherein a rim is elevated above the ice;
lowering a baited hook into the water through the ice by unwinding fishing line from the reel;
placing the first side of the handle on a first portion of the rim of the bucket and the rod portion on a second portion of the rim of the bucket such that the reel is above the rim of the bucket and is above the handle; and wherein as a fish takes line from the reel, the reel spins about the rotational axis and moves the grip in an arcuate path such that a moment force is placed on the handle which causes the ice fishing pole to roll about the longitudinal axis on the rim of the bucket such that the second side of the handle is contacting the rim of the bucket wherein the rotation of the handle from the first side to the second side causes the reel to be suspended within an interior space of the bucket and below the handle and wherein the movement of the handle to cause a sound that alerts an angler that the fish is moving the bait.

12. The method of claim 11, the bucket comprises a five gallon bucket.

13. The method of claim 11, wherein the pole rolls about the longitudinal axis when the grip is about orthogonal to the longitudinal axis.

14. The method of claim 11, wherein the pole rolls about the longitudinal axis when the grip is about 25° or less from orthogonal to the longitudinal axis.

15. The method of claim 11, and further comprising attaching a bell to the ice fishing pole wherein the bell rings when the ice fishing pole rolls about the longitudinal axis.

16. The method of claim 11, wherein the second side includes a groove substantially orthogonal to the longitudinal axis wherein after the handle rolls such that the second side is supported by the at least one object, the groove is positioned about one of the spaced apart elevated surfaces and prevents movement of the ice fishing pole along the longitudinal axis.

17. The method of claim 11, wherein the rotational axis of the reel is substantially orthogonal to the longitudinal axis of the ice fishing pole.

18. The method of claim 11, wherein the ice fishing pole comprises an axle non-rotatably secured to the handle wherein the reel rotates about the axle.

19. The method of claim 11, wherein a drag is placed on the reel by applying pressure thereto with a thumb of the user.

20. A method of ice fishing comprising:
providing an ice fishing pole comprising:
a handle having a substantially flat first side and a substantially flat opposing second side,
a rod portion extending from the handle wherein the ice fishing pole has a longitudinal axis extending through the handle and the rod portion;
a reel rotatably secured to the handle proximate the second side of the handle, the reel rotatable about a rotational axis substantially orthogonal to the longitudinal and containing fishing line; and
a grip attached to the reel a distance from the rotational axis wherein the grip is configured to be gripped and manipulate the reel;
placing a bucket on the ice wherein a rim is elevated above the ice;
lowering a baited hook into the water through the ice by unwinding fishing line from the reel;
placing the first side of the handle on a first portion of the rim of the bucket and the rod portion on a second portion of the rim of the bucket such that the reel is above the rim of the bucket and is above the handle;
wherein as a fish takes line from the reel, the reel rolls and moves the grip in an arcuate path such that a moment force is placed on the handle which causes the ice fishing pole to roll about the longitudinal axis on the rim of the bucket such that the second side of the handle is contacting the rim of the bucket wherein the rotation of the handle from the first side to the second side causes the reel to be suspended within an interior space of the bucket and below the handle, wherein the movement of the handle to cause a sound that alerts an angler that the fish is moving the bait;

gripping the handle;

raising the ice fishing pole from the bucket;

setting the hook into the fish;

applying pressure to the reel with the user's thumb to provide drag to the reel; and reeling in the fish by rotating the reel to wind line thereon.

\* \* \* \* \*